United States Patent
Handa

(10) Patent No.: US 8,554,435 B2
(45) Date of Patent: Oct. 8, 2013

(54) CONTROL DEVICE FOR CONTROLLING DRIVE FORCE THAT OPERATES ON VEHICLE

(75) Inventor: Toshiyuki Handa, East Liberty, OH (US)

(73) Assignee: Nissin Kogyo Co., Ltd., Ueda-Shi (JP)

( * ) Notice: Subject to any disclaimer, the term of this patent is extended or adjusted under 35 U.S.C. 154(b) by 306 days.

(21) Appl. No.: 13/075,881

(22) Filed: Mar. 30, 2011

(65) Prior Publication Data

US 2012/0253621 A1 Oct. 4, 2012

(51) Int. Cl.
*G06F 19/00* (2011.01)

(52) U.S. Cl.
USPC .......................................................... 701/69

(58) Field of Classification Search
None
See application file for complete search history.

(56) References Cited

U.S. PATENT DOCUMENTS

| | | | | |
|---|---|---|---|---|
| 5,559,703 | A | * | 9/1996 | Iwata et al. ..................... 701/86 |
| 5,819,194 | A | * | 10/1998 | Hara et al. ...................... 701/89 |
| 6,070,685 | A | * | 6/2000 | Takasaki et al. ............. 180/250 |
| 2006/0212173 | A1 | | 9/2006 | Post, II |
| 2008/0015764 | A1 | * | 1/2008 | Watanabe ....................... 701/72 |
| 2008/0183353 | A1 | * | 7/2008 | Post et al. ....................... 701/42 |
| 2009/0043469 | A1 | * | 2/2009 | Fukuda et al. .................. 701/69 |

* cited by examiner

*Primary Examiner* — Thomas Tarcza
*Assistant Examiner* — Garrett Evans
(74) *Attorney, Agent, or Firm* — Rankin, Hill & Clark LLP

(57) ABSTRACT

A control device for controlling a drive force that operates on a vehicle includes a first controller for controlling the drive force, and a second controller for sending to the first controller a limit of the drive force. The second controller has an input unit for inputting the drive force outputted from the first control means, and a calculation unit for computing in a first mode a limiting drive force for limiting the drive force. In a case that a first difference between the drive force and the limiting drive force is equal to or greater than a threshold value, the calculation unit calculates the limiting drive force in a second mode instead of the first mode so that the first difference is limited from becoming greater.

8 Claims, 5 Drawing Sheets

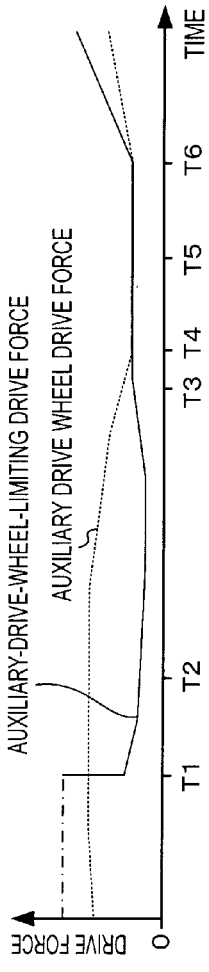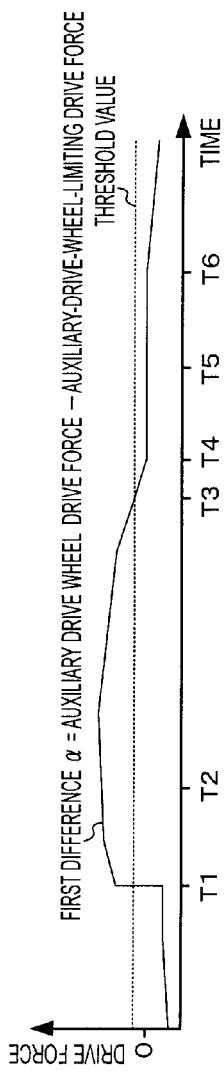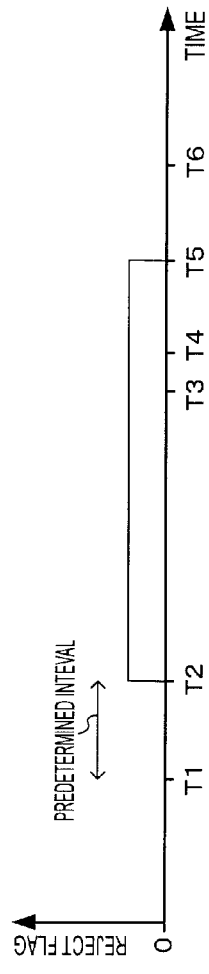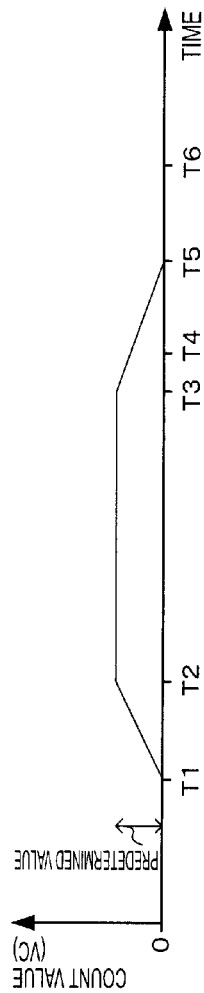
FIG.3 (A)
FIG.3 (B)
FIG.3 (C)
FIG.3 (D)

CONTROL DEVICE FOR CONTROLLING DRIVE FORCE THAT OPERATES ON VEHICLE

FIELD OF THE INVENTION

The present invention relates to a control device (drive force-control device) for controlling drive force that operates on a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-open Patent Application (JP-A) No. 2006-256605 discloses a four-wheel-drive electronic control unit (4WD-ECU) as such an electronic control device. The 4WD-ECU disclosed in Japanese Laid-open Patent Application No. 2006-256605 together with a vehicle stability assist (VSA)-ECU controls the drive force that acts on the vehicle; and, specifically, sets the four-wheel-drive force in terms of units of, e.g., torque.

A 4WD-ECU thus operates in coordination with the VSA-ECU and controls the drive force. Specifically, the VSA-ECU can request the 4WD-ECU to, e.g., limit the drive force and to judge whether to respond to such a request. Therefore, the VSA-ECU ascertains that the limitation of the drive force is insufficient and continues to overly request a limit of the drive force while the request from the VSA-ECU is rejected by the 4WD-ECU. The inventor recognized that there is a possibility that such an over request is unnecessary in the case that such a condition continues. Such a possibility was heretofore unknown by those skilled in the art.

A VSA-ECU or other vehicle behavior control means can generally be provided with at least one function from among a function for suppressing spinning of the wheels (traction control system), a function for suppressing locking of the wheels (antilock brake system), and a function for suppressing lateral sliding of a vehicle.

SUMMARY OF THE INVENTION

An object of the present invention is to provide a control device that can suppress excessively low calculation of the limiting drive force.

Other objects of the present invention will be apparent to those skilled in the art in the description of a plurality of modes and preferred embodiments below with reference to that attached diagrams.

A number of aspects from among the plurality of aspects pursuant to the present invention will be described below in order to facilitate understanding of the general overview of the present invention.

According to the present invention, there is provided a control device for controlling a drive force that operates on a vehicle, the control device comprising: first control means for controlling the drive force; and second control means for sending to the first control means a limit of the drive force, wherein the second control means has: an input unit for inputting the drive force outputted from the first control means, and a calculation unit for computing in a first mode a limiting drive force for limiting the drive force; and in a case that a first difference between the drive force and the limiting drive force is equal to or greater than a threshold value, the calculation unit calculates the limiting drive force in a second mode instead of the first mode so that the first difference is limited from becoming greater.

In the case that the first difference between the drive force and the limiting drive force is equal to or greater than the threshold value, the limiting drive force calculated in the second mode is more readily approximated to the drive force in comparison with the limiting drive force provisionally calculated in the first mode. Therefore, the first difference between the drive force and the limiting drive force is less liable to increase, and the first control means more readily accepts the limiting drive force calculated in the second mode. Calculation of an excessively low limiting drive force can be suppressed by avoiding continuous calculation of the limiting drive force in the first mode.

In one form of the invention, the calculation unit continues to calculate the limiting drive force in the first mode until a count value reaches a predetermined value, the count value being counted up when the first difference is equal to or higher than the threshold value; and after the count value has reached the predetermined value, the calculation unit calculates the limiting drive force in the second mode.

In the case that the first control means receives a request from the second control means, the first control means might not be capable of immediately receiving the request from the second control means. In other words, the response time of the first control means may be delayed. A predetermined value (or predetermined interval) is provided, whereby the second control means can confirm that the first control means is rejecting the request from the second control means, and can thereafter execute a second mode.

The second control means may send the limiting drive force to the first control means in the case that the vehicle is traveling in an unstable state.

The first control means receives a request from the second control means, and the first control means can reduce the drive force so that the traveling state of the vehicle becomes more stable.

According to the invention, the calculation unit may calculate the limiting drive force on the basis of a second difference between an actual yaw rate and a reference yaw rate of the vehicle.

The second control means is capable of computing the limiting drive force with consideration given to the traveling state of the vehicle brought about by the second difference.

The calculation unit may calculate the limiting drive force so that the second difference becomes smaller.

The actual yaw rate of the vehicle is brought closer to the reference yaw rate, whereby the stability of the vehicle can be improved.

Preferably, the first mode is a PID control mode; and the second mode is a PD control mode; wherein in the first mode, the calculation unit calculates a P term, an I term, and a D term in the PID control mode to calculate the limiting drive force, and in the second mode, the calculation unit calculates the P term and the D term in the PD control mode to calculate the limiting drive force.

The calculated limiting drive force may become less similar to the drive force when the I term continues to be calculated while the first control means rejects a request from the second control means. Calculation of the I term in the second mode is stopped, whereby underestimation of the limiting drive force can be reduced.

According to the invention, the first control means may control, as the drive force, a drive force of a main drive wheel and a drive force of an auxiliary drive wheel, wherein the drive force of the main drive wheel may be one of a drive force of a front wheel or a drive force of a rear wheel, and the drive force of the auxiliary drive wheel may be the other of the drive force of the front wheel or the drive force of the rear wheel; and the second control means may request a limit of the drive force of the auxiliary drive wheel as a limit of the drive force, and the calculation unit may calculate, as the limiting drive force, an auxiliary-drive-wheel-limiting drive force for limiting the drive force of the auxiliary drive wheel.

Computing an excessively low auxiliary-drive-wheel-limiting drive force can be suppressed in the case that the second control means requests a limit of the drive force of the auxiliary drive wheel from the first control means.

The first control means may be a drive force control means, and the second control means may be a vehicle behavior control means.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which:

FIGS. 3(A), 3(B), 3(C), and 3(D) are timing charts illustrative of the operation of a judgment unit of the control device;

DETAILED DESCRIPTION OF THE PREFERRED EMBODIMENTS

The embodiments described below are used for facilitating understanding of the present invention. Therefore, persons skilled in the art should note that that the present invention is not unduly limited by the embodiments described below.

1. Vehicle

Figure 1:
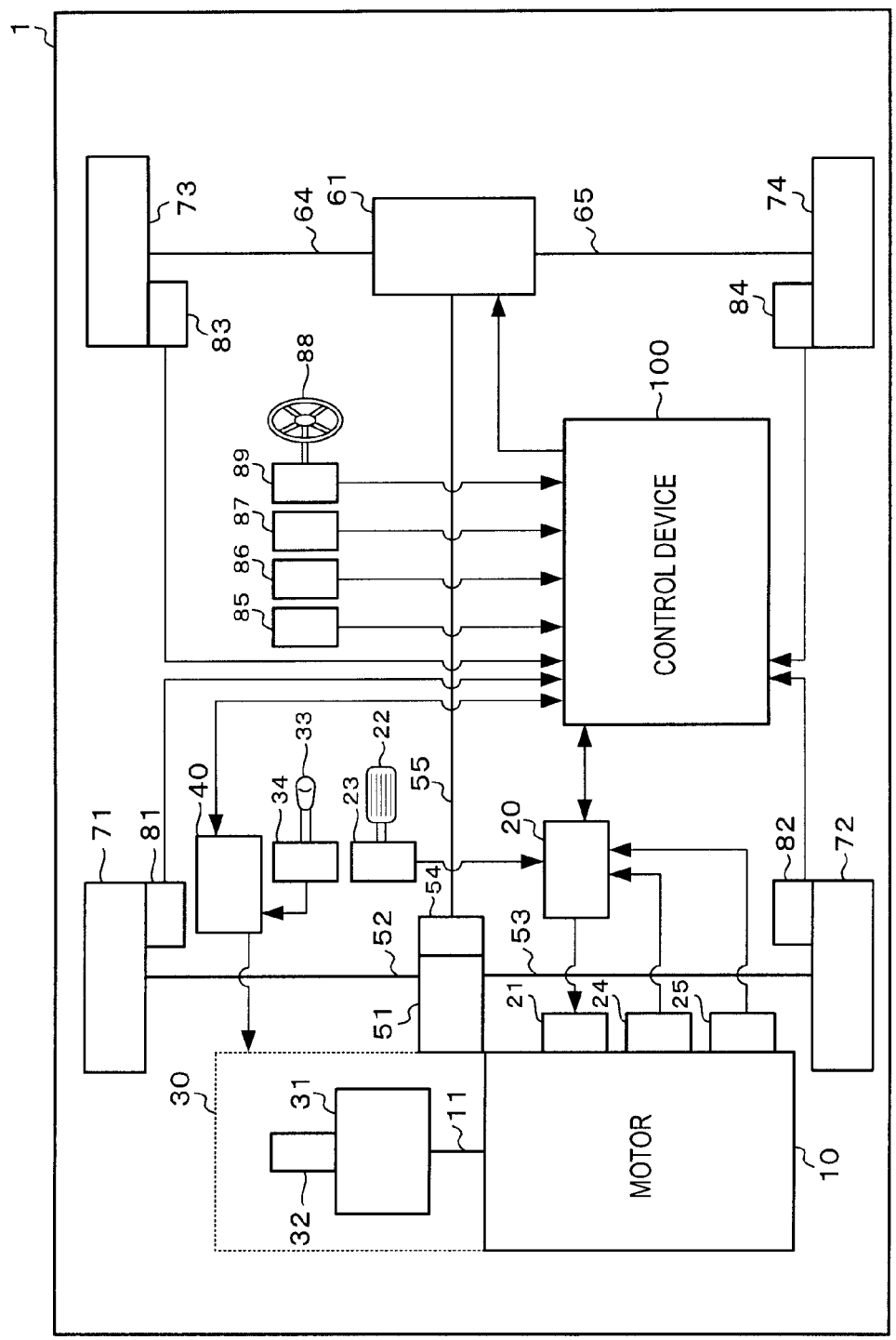
FIG. 1 is a diagrammatical view showing a general configuration of a vehicle provided with a control device according to the present invention.

FIG. 1 represents a schematic structural diagram of a vehicle provided with the control device according to the present invention. A vehicle 1 (e.g., an automobile) is provided with a control device 100 capable of executing various controls, as shown in FIG. 1. The control device 100 is capable of controlling the front wheel drive force (the target value of the drive force transmitted to front wheels 71, 72) and the rear wheel drive force (the target value of the drive force transmitted to rear wheels 73, 74) of the vehicle 1 as an example of the various controls. Specific control of the control device 100 according to the present invention is described below in "2. Control Device."

In the example of FIG. 1, the vehicle 1 is provided with a motor 10 (e.g., gasoline engine or another internal combustion engine), the motor 10 has an output shaft 11, and the motor 10 can cause the output shaft 11 to rotate. The vehicle 1 is provided with motor control means 20 (e.g., an engine ECU) for controlling the motor 10, and a throttle actuator 21. The motor control means 20 obtains the motor drive force (target value), and the motor control means 20 controls the throttle actuator 21 so that the rotation (the actual motor drive force) of the output shaft of the motor 10 matches the motor drive force (target value).

The throttle (not shown) position for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20. The motor control means 20 generally obtains the throttle position or the motor drive force on the basis of the amount of operation of the accelerator pedal 22. The vehicle 1 is provided with an engine speed sensor 24 and a pressure sensor 25. In the case that the motor 10 is, e.g., an engine, the engine speed sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the example of FIG. 1, the vehicle 1 may be provided with a power transmission device (power train, drive train). The power transmission device has, e.g., a transmission 30, a front differential gear mechanism 51, front drive shafts 52, 53, a transfer 54, a propeller shaft 55, a rear differential gear mechanism 61, and rear drive shafts 64, 65, as shown in FIG. 1. The transmission 30 has a torque converter 31 and a gear mechanism 32.

The power transmission device is not limited to the example of FIG. 1, and it is also possible to modify, revise, or implement the example of FIG. 1. The power transmission device may be, e.g., the drive force transmission system 3 disclosed in FIG. 2 of Japanese Laid-open Patent Application (JP-A) No. 07-186758.

The rotation (the actual motor drive force) of the output shaft of the motor 10 is converted to actual all-wheel drive force (the actual front-wheel drive force and the rear-wheel drive force) via the power transmission device. In the control related to such conversion, the all-wheel drive force (target value) is determined based on the motor drive force (target value) of the motor control means 20, the amplification factor (target value) of the torque converter 31, and the speed-change gear ratio (target value) of the gear mechanism 32. The distribution from the front-wheel drive force (target value), which is the main drive wheel drive force, to the rear-wheel drive force (target value), which is the auxiliary drive wheel drive force, is determined on the basis of the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the main drive wheel drive force, matches the all-wheel drive force (target value). In the case that the distribution ratio of the rear differential gear mechanism 61 is, e.g., (100−x):x in terms of the front-wheel drive force to rear-wheel drive force, the front-wheel drive force (target value), which is the main drive wheel drive force, matches the value obtained by subtracting the rear-wheel drive force (target value), which is the auxiliary drive wheel drive force, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the example of FIG. 1, the vehicle 1 is provided with transmission control means 40 (e.g., an automatic transmission (AT) ECU) for controlling the speed-change ratio (e.g., the speed-change gear ratio of the gear mechanism 32) of the transmission 30. The vehicle 1 is provided with a shift lever 33 and a shift position sensor 34, and the transmission control means 40 generally determines the speed-change gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a speed-change gear ratio that represents the first speed. In the case that the shift position of the shift lever 33 is, e.g., "D," the transmission control means 40 determines the speed-change gear ratio that represents any one among all of the speed-change gears constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a speed-change gear ratio that represents any one of, e.g., the first to fifth speeds. For example, when the transmission control means 40 thereafter changes from, e.g., the speed-change gear ratio that represents the first speed to the speed-change gear ratio that represents the second speed, the transmission control means 40 controls the gear mechanism 32 so that the gear mechanism 32 changes from the speed-change gear ratio that represents the first speed to the speed-change gear ratio that represents the second speed.

In the example of FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain the speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along the front-rear or longitudinal direction of the vehicle 1, and the control device 100 can correct the speed of the vehicle 1 using the acceleration.

In the example of FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89, and the steering angle sensor 89 detects the steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), but all of the controls described above are not required to be carried out. Described below is a general overview of control of the control device 100.

2. Control Device

Figure 2:
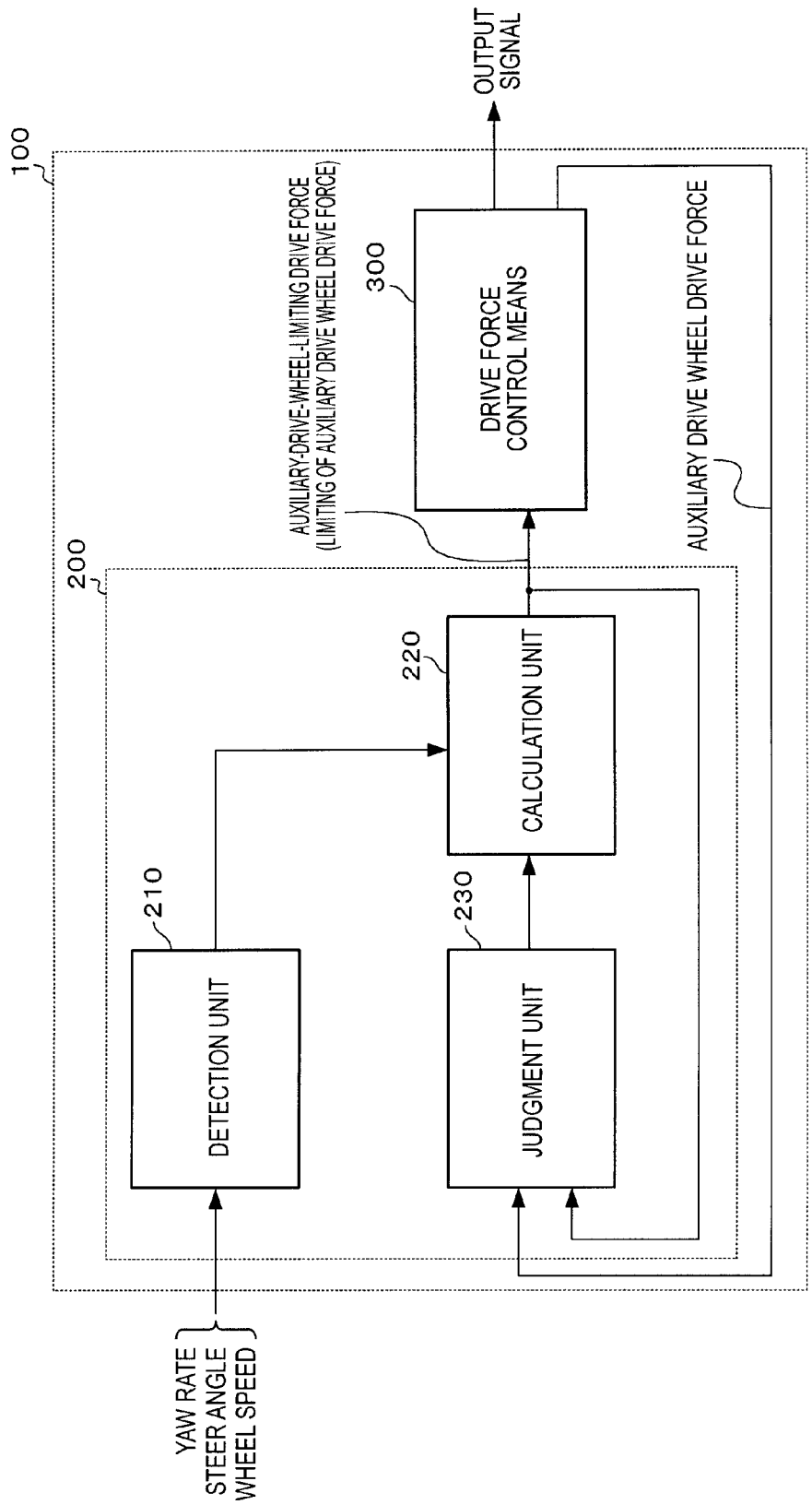
FIG. 2 is a block diagram showing a general configuration of the control device according to the present invention.

FIG. 2 shows in block diagram a general configuration of the control device according to the present invention. The control device 100 can accept, e.g., the yaw rate, the steer angle, and the wheel speed as input signals; can generate output signals; and can execute various controls, as shown in FIG. 2. The control device 100 is provided with drive force control means 300, and the drive force control means 300 controls the drive force of the main drive wheels (e.g., the front wheel drive force) and the auxiliary drive wheel drive force (e.g., rear wheel drive force), as an example of the various controls.

In the example of FIG. 2, the control device 100 is provided with vehicle behavior control means 200. The vehicle behavior control means 200 is capable of computing the limiting drive force for limiting the drive force as an example of various controls. The vehicle behavior control means 200 is capable of requesting from the drive force control means 300 the auxiliary-drive-wheels-limiting drive force (limiting drive force) for limiting the drive force of, e.g., the auxiliary drive wheels, and is capable of changing the method for computing the limiting drive force, as required.

Specifically, the drive force control means 300 determines the ratio between the main drive wheel drive force (target value) and the auxiliary drive wheel drive force (target value), for example, and determines, e.g., the auxiliary drive wheel drive force (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the auxiliary drive wheel drive force (target value).

When the auxiliary drive wheel drive force is zero due to the distribution ratio of the rear differential gear mechanism 61, in other words, when the propeller shaft 55 and the rear drive shafts 64, 65 are cut off from each other, the main drive wheel drive force (target value) or the front-wheel drive force matches the all-wheel drive force (target value) in the example of FIG. 1. Alternatively, when the auxiliary drive wheel drive force is not zero due to the distribution ratio of the rear differential gear mechanism 61, in other words, when the propeller shaft 55 and the rear drive shafts 64, 65 are connected, the main drive wheel drive force (target value) matches the value obtained by subtracting the auxiliary drive wheel drive force (target value) from the all-wheel drive force (target value) in the example of FIG. 1.

The drive force control means 300 is capable of outputting to the vehicle behavior control means 200 the determined auxiliary drive wheel drive force (target value). In other words, the input signal from the drive force control means 300 to the vehicle behavior control means 200 is, e.g., output from the drive force control means 300 (auxiliary drive wheel drive force (target value)).

In the example of FIG. 2, the control device 100 is provided with vehicle behavior control means 200. The vehicle behavior control means 200 may accept from the exterior input signals that express, e.g., yaw rate and the like acquired from the yaw rate sensor 86 of FIG. 1.

In the case that the vehicle behavior control means 200 makes a request for auxiliary-drive-wheels-limiting drive force (limiting drive force) to the drive force control means 300, the drive force control means 300 reduces the auxiliary drive wheel drive force (target value) and the drive force control means 300 increases the main drive wheel drive force (target value). At this time, the drive force control means 300 matches the auxiliary drive wheel drive force (target value) to the auxiliary-drive-wheels-limiting drive force (limiting drive force) to reduce the auxiliary drive wheel drive force (target value). Specifically, the drive force control means 300 controls the rear differential gear mechanism 61 so that the auxiliary drive wheel drive force is reduced by the distribution ratio of the rear differential gear mechanism 61. When the propeller shaft 55 and the rear drive shafts 64, 65 are more weakly connected, the actual auxiliary drive wheel drive force is reduced, and as a result, the actual main drive wheel drive force is increased. Reduced auxiliary drive wheel drive force makes it possible to, e.g., suppress oversteer. Therefore, the stability of the vehicle 1 is improved, for example.

The drive force control means 300 is capable of determining in advance the main drive wheel drive force (target value) and the auxiliary drive wheel drive force (target value), reducing the auxiliary drive wheel drive force (target value) determined in advance in accordance with the a request from the vehicle behavior control means 200, and increasing the main drive wheel drive force (target value) determined in advance.

The drive force control means 300 may also be referred to as first control means for determining the main drive wheel drive force (target value) and the auxiliary drive wheel drive force (target value), and the vehicle behavior control means 200 may be referred to as second control means. The drive force control means 300 (first control means) primarily determines the main drive wheel drive force (target value) and the auxiliary drive wheel drive force (target value). The drive force control means 300 (first control means) may determine whether to respond to the request for limiting the auxiliary drive wheel drive force (target value) from the vehicle behavior control means 200 (second control means), and may reject the request for limitation. In the case that the vehicle behavior control means 200 requests to the drive force control means 300 the auxiliary-drive-wheels-limiting drive force (limiting drive force), the drive force control means 300 (first control means) can secondarily (ultimately) determine the main drive wheel drive force (target value) and the auxiliary drive wheel drive force (target value).

3. Vehicle Behavior Control Means (Second Control Means)

FIG. 2 also shows a schematic structural diagram of the vehicle behavior control means 200 according to the present invention. The vehicle behavior control means 200 (second control means) is capable of requesting or instructing drive force control means 300 (first control means) to limit the drive force of the auxiliary drive wheel (target value). In the example of FIG. 2, the vehicle behavior control means 200 is provided with a detection unit 210, a calculation unit 220, and a judgment unit 230. The calculation unit 220 is capable of computing the auxiliary-drive-wheels-limiting drive force for limiting the drive force of the auxiliary drive wheel.

3.1. Detection Unit

The detection unit 210 detects, e.g., the unstable state of the vehicle 1 and can instruct the calculation unit 220 so that the calculation unit 220 calculates the auxiliary-drive-wheels-limiting drive force. In the case that an unstable state has been detected, the detection unit 210 can send to the calculation unit 220 a signal (e.g., a signal expressing a binary "1" or high level) expressing instruction or permission to calculate the auxiliary-drive-wheel-limiting drive force. For example, the actual yaw rate obtained from the yaw rate sensor 86 and the reference yaw rate calculated based on the speed of the vehicle 1 and the steering angle are used to determine whether or not the vehicle 1 is traveling in a stable state. Specifically, an unstable state can be defined as when the difference between the actual yaw rate and the reference yaw rate (yaw rate deviation) is greater than a predetermined value. Also, an unstable state may be determined by subjecting the yaw rate deviation to filter processing. It is also possible to correct or adjust the reference yaw rate using the lateral acceleration acquired from the lateral acceleration sensor 87.

The detection unit 210 can accept input of the steer angle from, e.g., the steering angle sensor 89. Also, the detection unit 210 is capable of calculating the average of four rotational speeds (wheel speeds) detected by, e.g., the wheel speed sensors 81, 82, 83, 84 and obtain the average wheel speed Vaw_av of the drive wheels as the speed of the vehicle 1. Alternatively, the detection unit 210 calculates the average of two rotational speeds (wheel speeds) detected by, e.g., wheel speed sensors 83, 84 and can obtain or estimate the speed Vvh_es of the vehicle 1.

The speed Vvh_es (estimated speed) of the vehicle 1 may include the application of an increasing limit and a decreasing limit to each of the wheel speeds of the rear wheels 73, 74 (auxiliary drive wheels) in order to eliminate the effect of noise caused by vibrations and the like of the vehicle 1, for example. In other words, the detection unit 210 is capable of correcting or adjusting the two rotational speeds (wheel speeds) detected by the wheel speed sensors 83, 84, computing the average of the two rotational speeds (wheel speeds) thus corrected or adjusted, and obtaining or estimating the speed Vvh_es of the vehicle 1. The speed Vvh_es (estimated speed) of the vehicle 1 may be estimated using another method.

The detection unit 210 is capable of sending to the calculation unit 220 a signal that expresses whether the traveling state of the vehicle 1 is unstable, and is furthermore capable of sending to the calculation unit 220 a signal that expresses the difference (yaw rate deviation, second difference) between the actual yaw rate and the reference yaw rate of the vehicle 1. In the case that the vehicle 1 is traveling in an unstable state, the calculation unit 220 is capable starting or restarting calculation of the auxiliary-drive-wheel-limiting drive force, and outputting to the drive force control means 300 the calculated auxiliary-drive-wheel-limiting drive force. The calculation unit 220 is capable of computing the auxiliary-drive-wheel-limiting drive force based on the yaw rate deviation when the auxiliary-drive-wheel-limiting drive force is to be calculated. Specifically, the calculation unit 220 can calculate the auxiliary-drive-wheel-limiting drive force so that the yaw rate deviation is reduced.

3.2. Judgment Unit

The judgment unit 230 of FIG. 2 accepts input of the auxiliary drive wheel drive force from the drive force control means 300 and the auxiliary-drive-wheel-limiting drive force (limit of the auxiliary drive wheel drive force) from the calculation unit 220. The judgment unit 230 is capable of computing the difference (first difference) between the auxiliary drive wheel drive force and the auxiliary-drive-wheel-limiting drive force, and is capable of judging whether the difference (first difference) is equal to or higher than a threshold value. The auxiliary drive wheel drive force is a value primarily (ultimately) determined by the drive force control means 300, and the calculation unit 220 or the vehicle behavior control means 200 output to the drive force control means 300 a request that the auxiliary drive wheel drive force be matched to the auxiliary-drive-wheel-limiting drive force. Therefore, in the case that there is a difference between the auxiliary drive wheel drive force and the auxiliary-drive-wheel-limiting drive force, the drive force control means 300 rejects the request from the vehicle behavior control means 200. In the case that the difference between the auxiliary drive wheel drive force and the auxiliary-drive-wheel-limiting drive force (first difference) is equal to or higher than a threshold value, the judgment unit 230 can send to the calculation unit 220 a signal (e.g., a signal expressing a binary "1" or high level) expressing rejection by the drive force control means 300. The calculation unit 220 can change the method for computing the auxiliary-drive-wheel-limiting drive force in the case that the calculation unit 220 has received input of a signal expressing rejection by the drive force control means 300. Specifically, the calculation unit 220 can change a PID control mode or other first mode to a PD control or other second mode and calculate the auxiliary-drive-wheel-limiting drive force. Described hereinbelow is an example of judgment of whether the drive force control means 300 has rejected the request from the vehicle behavior control means 200.

3.2.1. Judgment Example

The judgment unit 230 of FIG. 2 may immediately determine whether the drive force control means 300 is rejecting the request from the vehicle behavior control means 200 in the case that the difference (first difference) between the auxiliary drive wheel drive force and the auxiliary-drive-wheel-limiting drive force is equal to or higher than a threshold value. However, even in the case that the drive force control means 300 will accept the request from the vehicle behavior control means 200, the drive force control means 300 may not be able to immediately accept the request from the vehicle behavior control means 200. In other words, the response time of the drive force control means 300 may be delayed. Therefore, the judgment unit 230 determines that the drive force control means 300 is not rejecting the request from the vehicle behavior control means 200 until a count value has reached a predetermined value, the count value being incremented when the difference (first difference) between the auxiliary drive wheel drive force and the auxiliary-drive-wheel-limiting drive force is equal to or higher than a threshold value. After the count value has reached the predetermined value, the judgment unit 230 judges that the drive force control means 300 is rejecting the request from the vehicle behavior control means 200.

FIGS. 3(A), 3(B), 3(C), and 3(D) are timing charts explanatory of the operation of the judgment unit 230. The solid line in the example of FIG. 3(A) represents the auxiliary-drive-wheel-limiting drive force calculated by the calculation unit 220, and the dotted line shows the auxiliary drive wheel drive force determined by the drive force control means 300. The calculation unit 220 or the vehicle behavior control means 200 does not request or instructs a limit of the auxiliary drive wheel drive force to the drive force control means 300 until time T1. In other words, the output from the calculation unit 220 is a value (single-dot-dash line) that does not limit the auxiliary drive wheel drive force. The value that does not limit the auxiliary drive wheel drive force is, e.g., a maximum value of the auxiliary drive wheel drive force that can be determined by the drive force control means 300. At time T1, the calculation unit 220 requests from (outputs to) the drive force control means 300 a limit (a value for limiting the auxiliary drive wheel drive force; the auxiliary-drive-wheel-limiting drive force) of the auxiliary drive wheel drive force. The drive force control means 300 rejects the request from the calculation unit 220 and does not allow the drive force of the auxiliary drive wheel to match the auxiliary-drive-wheel-limiting drive force. In other words, the drive force control means 300 can use the primarily determined auxiliary drive wheel drive force as the secondarily (ultimately) determined auxiliary drive wheel drive force. In the example of FIG. 3(A), the drive force control means 300 accepts a request from the calculation unit 220 from time T4 to time T6 and causes the auxiliary drive wheel drive force to match the auxiliary-drive-wheel-limiting drive force, which is drawn with a solid bold line.

In the example of FIG. (B), the solid line represents a first difference α (i.e., the product of the auxiliary drive wheel drive force and the auxiliary-drive-wheel-limiting drive force) calculated by the judgment unit 230, and the dotted line represents a threshold value. The threshold value is, e.g., a value greater than zero, but may also be zero. At time T1, the first difference α exceeds the threshold value. At this time, the judgment unit 230 obtains the count value incremented at a predetermined timing when the first difference α is equal to or greater than the threshold value. The judgment unit 230 determines whether the count value has reached a maximum value MAX (predetermined value) at time T1 and thereafter.

The maximum value MAX (predetermined value) corresponds to a predetermined interval in the case that the count value increases monotonically from a minimum value MIN (e.g., zero) to the maximum value MAX. Therefore, the judgment unit 230 may judge whether the first difference α continues to be equal to or greater than the threshold value at time T2, which occurs after a predetermined interval has elapsed from time T1.

The judgment unit 230 sets a reject flag to, e.g., "1" in the case that the count value has reached the maximum value MAX (predetermined value or predetermined interval). The reject flag representing "1" represents that the drive force control means 300 is rejecting the request from the calculation unit 220. The reject flag is set in, e.g., the judgment unit 230, specifically, in a storage unit (e.g., memory, register, or the like (not shown)) in the judgment unit 230.

In the example of FIG. 3(C), the solid line represents the reject flag set by the judgment unit 230. The reject flag represents, e.g., "0" until time T2. The reject flag represents, e.g., "1" at time T2.

In the example of FIG. 3(D), the solid line represents the count value (VC) set by, e.g., the judgment unit 230 (storage unit, not shown). The count value represents, e.g., the minimum value MIN (e.g., zero) until time T1. The judgment unit 230 begins incrementing the count value at time T1. The count value represents, e.g., the maximum value MAX at time T2. The count value representing the maximum value MAX expresses that the interval in which the first difference α is equal to or higher than the threshold value is a predetermined interval or greater. The judgment unit 230 retains the count value (maximum value MAX) and does not increment the value when the first difference α is equal to or higher than the threshold value from time T2 to time T3.

In the example of FIG. 3(B), the first difference α matches the threshold value at time T3, and the first difference α is less than the threshold value at time T3 and thereafter. The judgment unit 230 may immediately return the reject flag to, e.g., "0" at time T3. However, the count value decremented with predetermined timing when the first difference α is less than the threshold value is obtained in order to prevent the drive force from changing too readily. The judgment unit 230 judges whether the count value has reached the minimum value MIN at time T3 and thereafter. The judgment unit 230 sets the reject flag to, e.g., "0" (see FIG. 3(C)) at time T5, which occurs after a predetermined interval has elapsed from time T3.

In the example of FIG. 3(D), the judgment unit 230 begins decrementing the count value at time T3. The count value represents, e.g., the maximum value MAX at time T3, and the count value represents, e.g., the minimum value MIN at time T5. The judgment unit 230 retains the count value (minimum value MIN) and does not decrement the value even when the first difference α is less than the threshold value at time T5 and thereafter.

3.2.2. Judgment Method

The judgment unit 230 can use the flag (reject flag) representing whether the drive force control means 300 is rejecting a request from the vehicle behavior control means 200, as shown in FIG. 3(C). The judgment unit 230 can change the flag setting on the basis of the count value (VC), as shown in FIG. 3(D). The judgment method of the judgment unit 230, specifically, the method for setting the flag and VC is described below.

Figure 4:
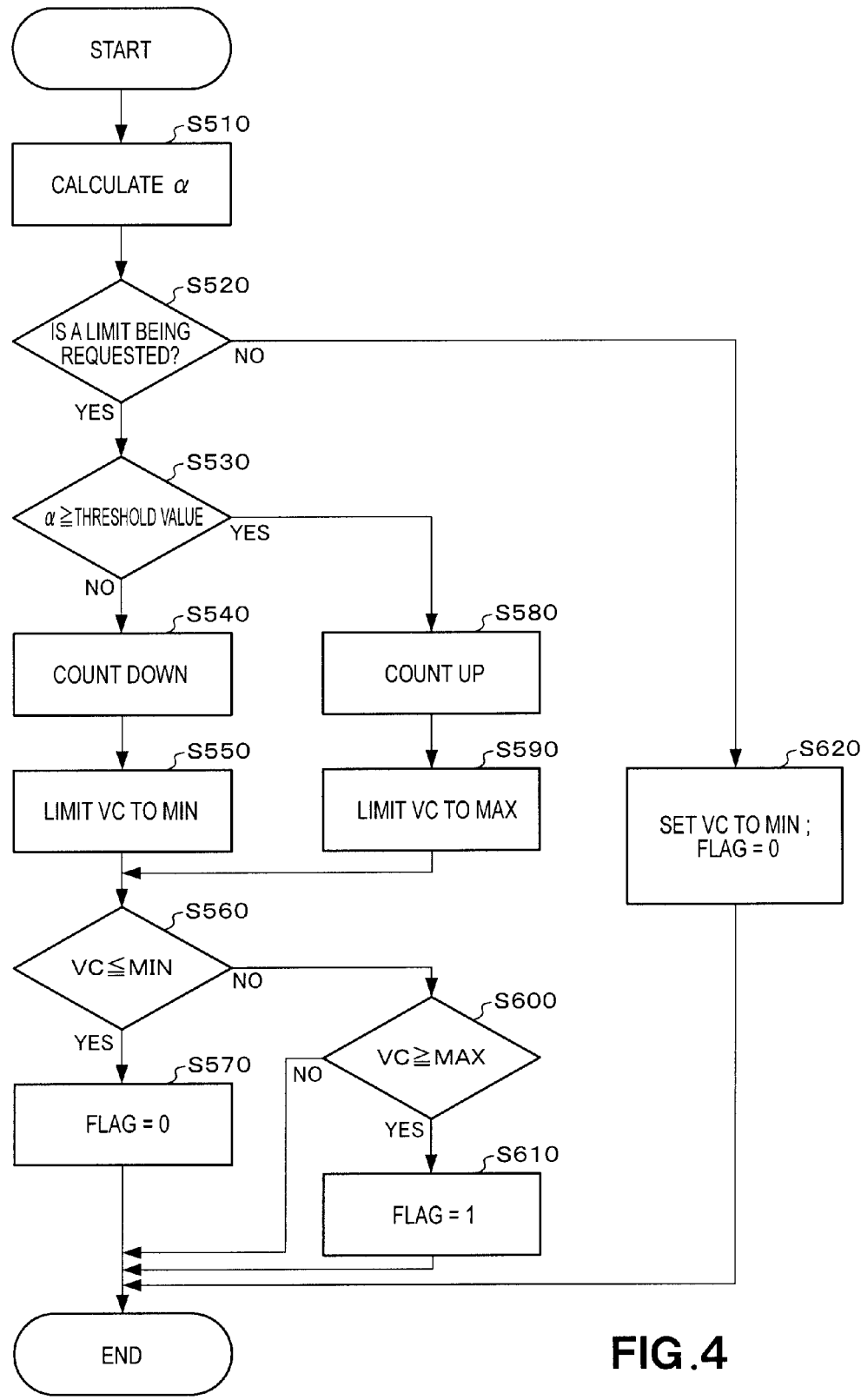
FIG. 4 is a flowchart showing an example of the judgment process performed by the judgment unit.

FIG. 4 is a flowchart showing an example of the judgment process performed by the judgment unit 230. The judgment unit 230 repeats a series of processes represented in FIG. 4 with predetermined timing (steps S510 to S620). The judgment unit 230 calculates α (a value obtained by subtracting the auxiliary-drive-wheel-limiting drive force from the auxiliary drive wheel drive force) at, e.g., each predetermined timing (step S510), and the flag (reject flag) and VC (count value) can be set or updated. The initial values of the flag and VC are, e.g., "0."

In the example of FIG. 4, the judgment unit 230 judges (step S520) whether the calculation unit 220 is requesting from the drive force control means 300, e.g., a limit of the auxiliary drive wheel drive force. In the example of, e.g., FIG. 3(A), the judgment unit 230 judges that a limit of the auxiliary drive wheel drive force is not being requested from the drive force control means 300 until time T1 (step S520; No), and the judgment unit 230 judges that that a limit of the auxiliary drive wheel drive force is being requested from the drive force control means 300 at time T1 and thereafter (step S520; Yes).

In the example of FIG. 4, the judgment unit 230 judges whether α (the value obtained by subtracting the auxiliary-drive-wheel-limiting drive force from the auxiliary drive wheel drive force) is equal to or higher than the threshold value (step S530). In the example of, e.g., FIG. 3(B), the judgment unit 230 judges that α is equal to or higher than the threshold value from time T1 to time T3 (step S530; Yes), and the judgment unit 230 judges that α is less than the threshold value (step S530; No) from time T3 onwards.

In the example of FIG. 4, the judgment unit 230 increments VC (step S580) in the case that Yes is judged to be the result in step S530. However, VC is not set to be greater than MAX (step S590). In the example of, e.g., FIG. 3(D), VC increases from MIN to MAX from time T1 to time T2, and VC represents MAX from time T2 to time T3. In the example of FIG. 4, the judgment unit 230 decrements (step S540) VC (count value) in the case that No is judged to be the result of step S530. However, VC is not set (step S550) to be less than MIN (minimum value). In the example of, e.g., FIG. 3(D), VC is MIN (minimum value) at time T5 and thereafter, and VC decreases from MAX (maximum value) to MIN from time T3 to time T5. In the example of FIG. 4, the judgment unit 230 judges whether VC is MIN or less (step S560). In the example of FIG. 3(D), the judgment unit 230 judges that VC is MIN or less (step S560; Yes) from time T1 to time T5, and the judgment unit 230 judges that VC is greater than MIN (step S560; No) at time T5 and thereafter.

In the example of FIG. 4, the judgment unit 230 sets (step S570) the flag to "0" in the case that Yes is judged to be the result of step S560. In the example of, e.g., FIG. 3(C), the judgment unit 230 sets or updates the flag to "0" at time T5 and thereafter.

In the example of FIG. 4, the judgment unit 230 judges whether VC is MAX or greater (step S600) in the case that No is judged to be the result of step S560. In the example of, e.g., FIG. 3(D), the judgment unit 230 judges that VC is less than MAX from time T1 to time T2 and from time T3 to time T5 (step S600; No); and the judgment unit 230 judges that VC is MAX or greater (step S600; Yes) from time T2 to time T3.

In the example of FIG. 4, the judgment unit 230 sets the flag to "1" (step S610) in the case that Yes is judged to be the result in step S600. In the example of, e.g., FIG. 3(C), the judgment unit 230 sets or updates the flag to "1" from time T2 to time T3. The judgment unit 230 leaves the flag unchanged in the case that No is judged to be the result in step S600. In the example of, e.g., FIG. 3(C), the judgment unit 230 maintains "0" from time T1 to time T2, and the judgment unit 230 maintains "1" from time T3 to time T5.

In the example of FIG. 4, the judgment unit 230 sets VC to MIN and the flag to "0" (step S620) in the case that No is judged to be the result of step S520. In the example of, e.g., FIG. 3(D), the judgment unit 230 sets VC to MIN until time T1. In the example of, e.g., FIG. 3(C), the judgment unit 230 sets the flag to "0" until time T1.

3.3. Calculation Unit

The calculation unit 220 of FIG. 2 is capable of computing the auxiliary-drive-wheels-limiting drive force for limiting, e.g., the auxiliary drive wheel drive force that is primarily determined by the drive force control means 300. The calculation unit 220 is capable of computing the auxiliary-drive-wheel-limiting drive force using a plurality of calculation methods, and for example, the calculation unit 220 ordinarily calculates the auxiliary-drive-wheel-limiting drive force in the first mode. After the incremented count value (VC) has reached MAX (predetermined value) when the difference (first difference) between the auxiliary drive wheel drive force and the auxiliary-drive-wheel-limiting drive force is equal to or greater than the threshold value, the calculation unit 220 calculates the auxiliary-drive-wheel-limiting drive force in the second mode instead of the first mode. Specifically, when the calculation unit 220 receives a signal (e.g., a signal expressing a binary "1" or high level) expressing rejection by the drive force control means 300 from the judgment unit 230, the calculation unit 220 calculates the auxiliary-drive-wheel-limiting drive force in the second mode. Alternatively, the calculation unit 220 calculates the auxiliary-drive-wheel-limiting drive force in the second mode when the reject flag is shown to be, e.g., "1" by the judgment unit 230.

The calculation unit 220 can accept as input from the detection unit 210 a signal that represents the difference (yaw rate deviation, second difference) between the actual yaw rate and the reference yaw rate of the vehicle 1. The calculation unit 220 can calculate the auxiliary-drive-wheel-limiting drive force on the basis of, e.g., the yaw rate deviation (second difference). Specifically, the calculation unit 220 can select a suitable calculation method from among a plurality of calculation methods so that the yaw rate deviation is reduced. For example, the PID control method can be selected as the first mode.

The calculation unit 220 unnecessarily reduces the auxiliary-drive-wheel-limiting drive force when calculation of the auxiliary-drive-wheel-limiting drive force is continued in the PID control mode even in the case that the drive force control means 300 rejects a request from the calculation unit 220. In other words, the PD control mode, for example, is preferably selected as the second mode in such a case.

Figure 5:
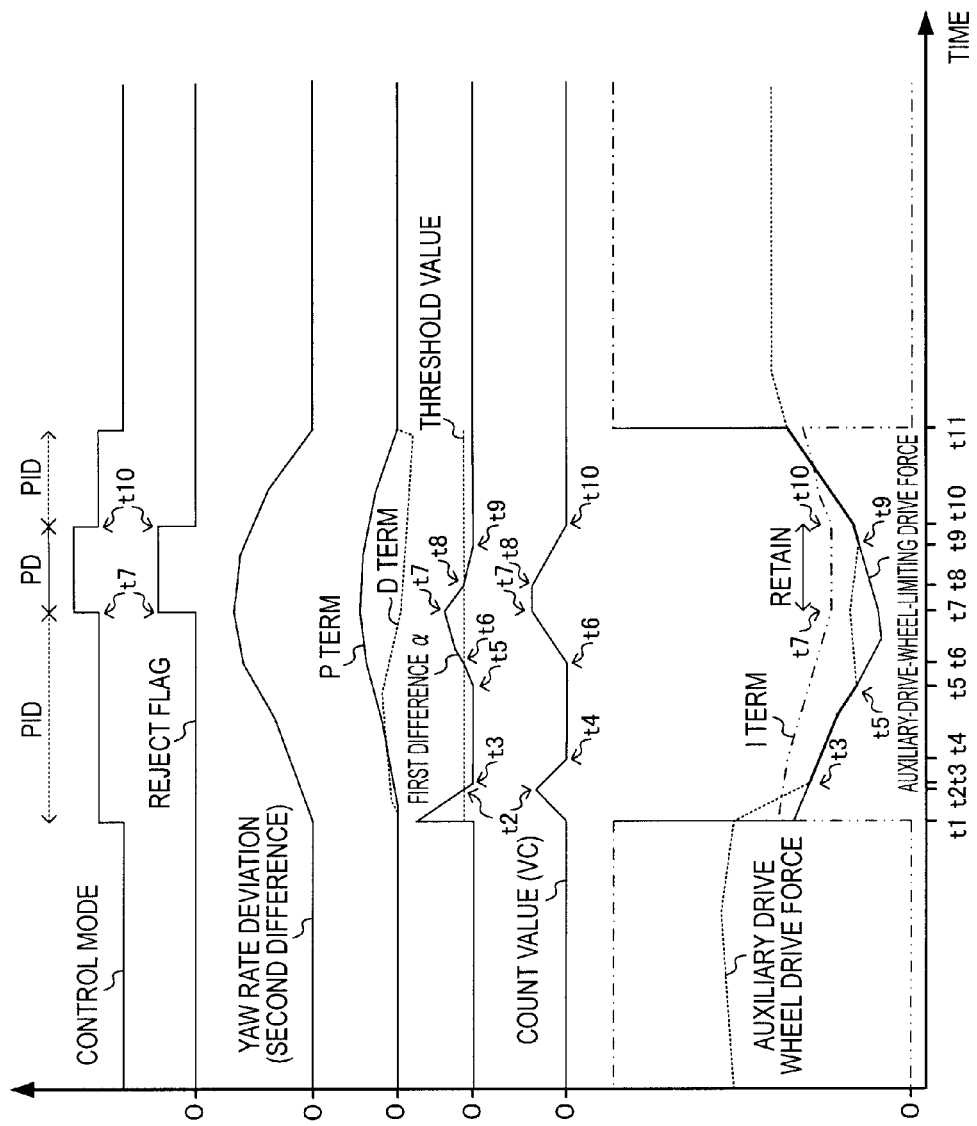
FIG. 5 is a timing chart showing the switching timing between the PID control mode and the PD control mode.

FIG. 5 represents a schematic structural diagram of the switching timing between the PID control mode and PD control mode. Various values are represented in the example of FIG. 5. In the example of FIG. 5, the control mode (solid line) represents three control modes. The three control modes comprise a mode in which the calculation unit 220 does not request an auxiliary-drive-wheel-limiting drive force (until time t1 and at as well as after time t11), an ordinary mode of when the calculation unit 220 requests an auxiliary-drive-wheel-limiting drive force (PID control mode from time t1 to time t7 and from time t10 to time t11), and an anomalous mode (PD control mode from time t7 to time t10). In the example of FIG. 5, the timing for switching between the PID control mode and the PD control mode is based on the reject flag (solid line). In the example of FIG. 5, the reject flag is based on the count value (solid line), and the count value (VC) is based on the first difference α (solid line) and the threshold value (dotted line). In the example of FIG. 5, the first difference α is a value obtained by subtracting the auxiliary-drive-wheel-limiting drive force (solid line) from the auxiliary drive wheel drive force (dotted line).

In the example of FIG. 5, the reject flag represents "0" until time t7 and at as well as after time t10, and the reject flag represents "1" from time t7 until time t10. The count value represents MIN (e.g., zero) until time t1, from time t4 to time t6, and at as well as after time t10. The count value increases from MIN when α is equal to or higher than the threshold value from time t1 to time t2, and the count value thereafter decreases from time t2 when α is less than the threshold value and reaches MIN at time t4. The count value increases from MIN when α is again equal to or greater than the threshold value from time t6 to time t7. The count value reaches MAX at time t7. The count value thereafter decreases from time t8 when α is again less than the threshold value. The count value reaches MIN at time t10.

The auxiliary-drive-wheel-limiting drive force (solid line) is based on the yaw rate deviation (solid line), and is specifically calculated by PID control or PD control so that the yaw rate deviation is reduced. The auxiliary-drive-wheel-limiting drive force is based on the P term (solid line), the I term (two-dot-dash line) and the D term (dotted line); and is the absolute value of, e.g., "I term−P term−D term." The P term is a value obtained by multiplying the P term gain (coefficient) by the yaw rate deviation, and the D term is a value obtained by multiplying the D term gain (coefficient) by the derivative of the yaw rate deviation. The I term (current) is a value obtained by adding the I term (previous) and the value obtained by multiplying the I term gain (coefficient) and the yaw rate deviation. The P term gain, D term gain, and I term gain are fixed values and can be suitably set. However, in PD control mode, the I term gain is set to zero, whereby the I term (current) matches the I term (previous), and the I term when a change is made from the PID control mode to the PD control mode is retained (the interval from time t7 to time t10 of FIG. 5). The auxiliary-drive-wheel-limiting drive force calculated in the PD control mode is thereby readily brought close to the auxiliary drive wheel drive force in comparison with the auxiliary-drive-wheel-limiting drive force (not shown) provisionally calculated in the PID control mode during the interval in which the reject flag represents a high level. In other words, the PD control mode is used in the interval in which the reject flag represents a high level so as to suppress an increase in the difference (first difference) between the auxiliary drive wheel drive force and the auxiliary-drive-wheel-limiting drive force. The calculation unit 220 thus calculates the P term, the I term, and the D term in the PID control mode to calculate the auxiliary-drive-wheel-limiting drive force. The calculation unit 220 calculates the P term and the D term in the PD control mode to calculate the auxiliary-drive-wheel-limiting drive force. However, the calculation unit 220 can essentially stop calculation of the I term in the PD control mode by retaining the I term of when a change is made from the PID control mode to the PD control mode.

The calculation unit 220 calculates a value (single-dot-dash line) that does not limit the auxiliary drive wheel drive force in the case that the calculation unit 220 does not request an auxiliary-drive-wheel-limiting drive force. A value that does not limit the auxiliary drive wheel drive force is the maximum value of the auxiliary drive wheel drive force that can be determined by, e.g., the drive force control means 300.

The solid line from time t3 to time T5, and from time t9 to time t11 in the example of FIG. 5 is drawn in bold and during this interval the drive force control means 300 receives requests from the calculation unit 220 and causes the drive force of the auxiliary drive wheel (dotted line) to match the auxiliary-drive-wheel-limiting drive force (solid line).

Obviously, various minor changes and modifications of the present invention are possible in light of the above teaching. It is therefore to be understood that within the scope of the appended claims the invention may be practiced otherwise than as specifically described.

What is claimed is:

1. A control device for controlling a drive force that operates on a vehicle, the control device comprising:
   a first controller that is configured to control the drive force and to output the drive force; and
   a second controller that is configured to send a limit of the drive force to the first controller, wherein
   the second controller comprises:
   an input unit that is configured to receive the drive force output by the first controller, and a calculation unit configured to compute a limiting drive force for limiting the drive force in either of a first and second mode, wherein, when the calculation unit computes the limiting drive force in a first mode and a difference between the drive force and the limiting drive force is equal to or greater than a threshold value, the calculation unit calculates the limiting drive force in a the second mode instead of the first mode, whereby calculating the limiting drive force in the second mode prevents the difference from increasing.

2. The control device according to claim 1, wherein the calculation unit continues to calculate the limiting drive force in the first mode until a count value reaches a predetermined value, the count value being counted up when the difference is equal to or greater than the threshold value; and after the count value has reached the predetermined value, the calculation unit calculates the limiting drive force in the second mode.

3. The control device according to claim 1, wherein the second controller is configured to send the limiting drive force to the first controller when the vehicle is determined to be traveling in an unstable state.

4. The control device according to claim 1, wherein the calculation unit calculates the limiting drive force based upon a difference between an actual yaw rate and a reference yaw rate of the vehicle.

5. The control device according to claim 4, wherein the calculation unit calculates the limiting drive force so that the difference between the actual yaw rate and the reference yaw rate is reduced.

6. The control device according to claim 5, wherein the first mode is a PID control mode; the second mode is a PD control mode; in the first mode, the calculation unit calculates a P term, an I term, and a D term in the PID control mode to calculate the limiting drive force; and in the second mode, the calculation unit calculates the P term and the D term in the PD control mode to calculate the limiting drive force.

7. The control device according to claim 1, wherein the first controller is configured to control, as the drive force, a drive force of a main drive wheel and a drive force of an auxiliary drive wheel, wherein the drive force of the main drive wheel is one of the drive force of a front wheel or the drive force of a rear wheel, and the drive force of the auxiliary wheel is the other of the drive force of the front wheel or the drive force of the rear wheel; and the second controller is configured to send a limit of the drive force of the auxiliary wheel as a limit of the drive force, and the calculation unit calculates, as the limiting drive force, an auxiliary-drive-wheel-limiting drive force for limiting the drive force of the auxiliary drive wheel.

8. The control device according to claim 1, wherein the first controller is a drive force controller, and the second controller is a vehicle behavior controller.

* * * * *